W. S. SLECHTA, Jr.
CULTIVATOR ATTACHMENT.
APPLICATION FILED APR. 22, 1916.
1,197,557.
Patented Sept. 5, 1916.
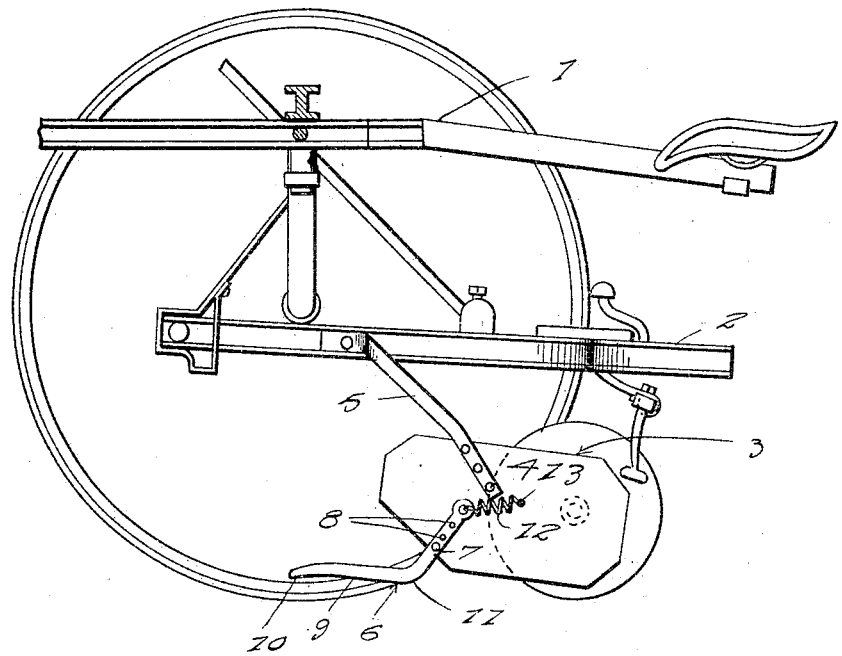
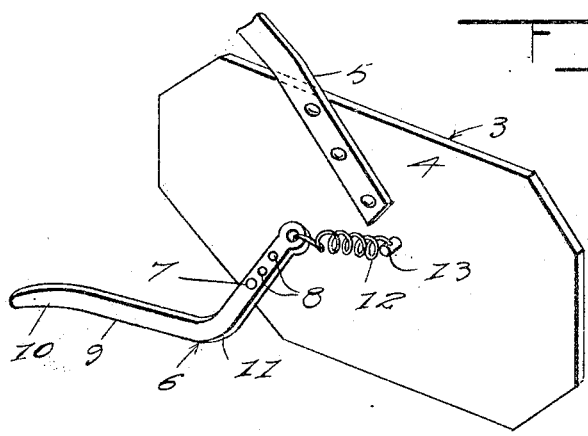
Inventor
W. S. Slechta, Jr.

United States Patent Office.

WESLEY S. SLECHTA, JR., OF VAIL, IOWA.

CULTIVATOR ATTACHMENT.

1,197,557.                Specification of Letters Patent.      Patented Sept. 5, 1916.

Application filed April 22, 1916. Serial No. 92,896.

*To all whom it may concern:*

Be it known that I, WESLEY S. SLECHTA, Jr., a citizen of the United States, residing at Vail, in the county of Crawford and State of Iowa, have invented certain new and useful Improvements in Cultivator Attachments; and I do hereby declare the following to be a full, clear, and exact description of the invention, such as will enable others skilled in the art to which it appertains to make and use the same.

This invention relates to an attachment for cultivators, and more particularly, to an arm which is adapted for attachment to the fender of an ordinary disk or shovel cultivator, which arm projects forwardly of the fender and is provided for engaging and raising down stalks of corn, during cultivation so as to prevent the cultivating elements from covering the down stalks of corn during the cultivation of the same, and also to eliminate the liability of the breaking or crushing of the down stalks.

Another object of this invention is to provide a spring which is connected to the fender and to one end of the pivoted arm so as to permit the arm to move upon its pivotal support, when it engages a rock, root or other foreign article, so as to eliminate the liability of breaking the arm or the fender which spring also acts to automatically return the arm to its normal operative position after it has passed over a rock or root.

With the foregoing and other objects in view, this invention consists in such novel features of construction, combination and arrangement of parts as will be hereinafter more fully described, illustrated in the accompanying drawing and claimed.

In describing the invention in detail reference will be had to the accompanying drawing wherein like characters designate like and corresponding parts throughout the several views, and in which:—

Figure 1 is a view showing the improved arm and a fender attached to a cultivator, and Fig. 2 is a perspective view of a fender illustrating the arm attached thereto.

Referring more particularly to the drawing, 1 designates a cultivator of ordinary construction, and 2 the cultivator standard. The fender which is generically indicated by the numeral 3, is of the usual type employed upon disk or shovel cultivators, and it comprises a blade 4 and an arm 5, by means of which it is connected to the cultivator standard 2. The arm 6, is pivotally connected as shown at 7 to the blade 4 of the fender structure 3. The arm 6 is provided with a plurality of openings 8, through which a pivot pin passes, so that the arm may be adjustably connected to the blade. The arm 6 has a forwardly extending portion 9, the forward end of which has its upper surface tapered downwardly, as shown at 10. The arm 6 is bent upwardly as shown at 11 and it has a spring 12 connected to its upper end, which spring is in turn connected to a pin 13 carried by the blade 4, or in any suitable manner rigidly connected to the blade so that in case the substantially horizontal portion 9 of the arm 6 strikes a rock, root or other foreign article, the arm may move rearwardly, upon its pivot support 7 and ride over the rocks or foreign objects. The spring 12 will, immediately after the arm has passed over the rock or foreign article contract and automatically move the arm to its normal position.

The arm 6 projects forwardly from the fender 4 and is provided for engaging beneath down stalks of corn or analogous grain for lifting the down stalks and preventing the cultivating elements of the cultivator 1 from covering the down stalks or mutilating them during the cultivating operation.

In the use of the device, an arm is attached to each of the fenders for travel upon each side of the row of grain being cultivated.

In reducing the invention to practice, certain minor features of construction, combination and arrangement of parts necessitate alteration, to which the patentee is entitled provided such alterations are comprehended within the scope of what is claimed.

What is claimed is:—

The combination with an ordinary cultivator fender, of an arm pivotally connected intermediate of its ends to the fender, said arm having a substantially horizontally positioned forwardly extending portion the upper outer end of which is slightly tapered, said arm being adapted for insertion beneath down stalks of grain for raising them and preventing them from being covered by a cultivator, and a spiral spring having one end connected to the fender blade and the other end connected to the upper end of said arm for automatically returning said arm to its normal position after it has been forced therefrom.

In testimony whereof I affix my signature in presence of two witnesses.

WESLEY S. SLECHTA, Jr.

Witnesses:
L. L. HANNAN,
C. R. RHODES.

Copies of this patent may be obtained for five cents each, by addressing the "Commissioner of Patents, Washington, D. C."